March 16, 1965 W. A. EISELE 3,173,744

RECORDING SYSTEM

Filed Nov. 14, 1962 3 Sheets-Sheet 1

WILLIAM A. EISELE
INVENTOR

BY [signature]

ATTORNEY

March 16, 1965 W. A. EISELE 3,173,744

RECORDING SYSTEM

Filed Nov. 14, 1962 3 Sheets-Sheet 2

WILLIAM A. EISELE
INVENTOR

BY [signature]

ATTORNEY

March 16, 1965 W. A. EISELE 3,173,744

RECORDING SYSTEM

Filed Nov. 14, 1962 3 Sheets-Sheet 3

WILLIAM A. EISELE
*INVENTOR*

*BY*

*ATTORNEY*

United States Patent Office 3,173,744
Patented Mar. 16, 1965

3,173,744

RECORDING SYSTEM

William A. Eisele, Pleasantville, N.Y., assignor to Universal Match Corporation, St. Louis, Mo., a corporation of Delaware Filed Nov. 14, 1962, Ser. No. 237,649
20 Claims. (Cl. 346—34)

Figure 1A:
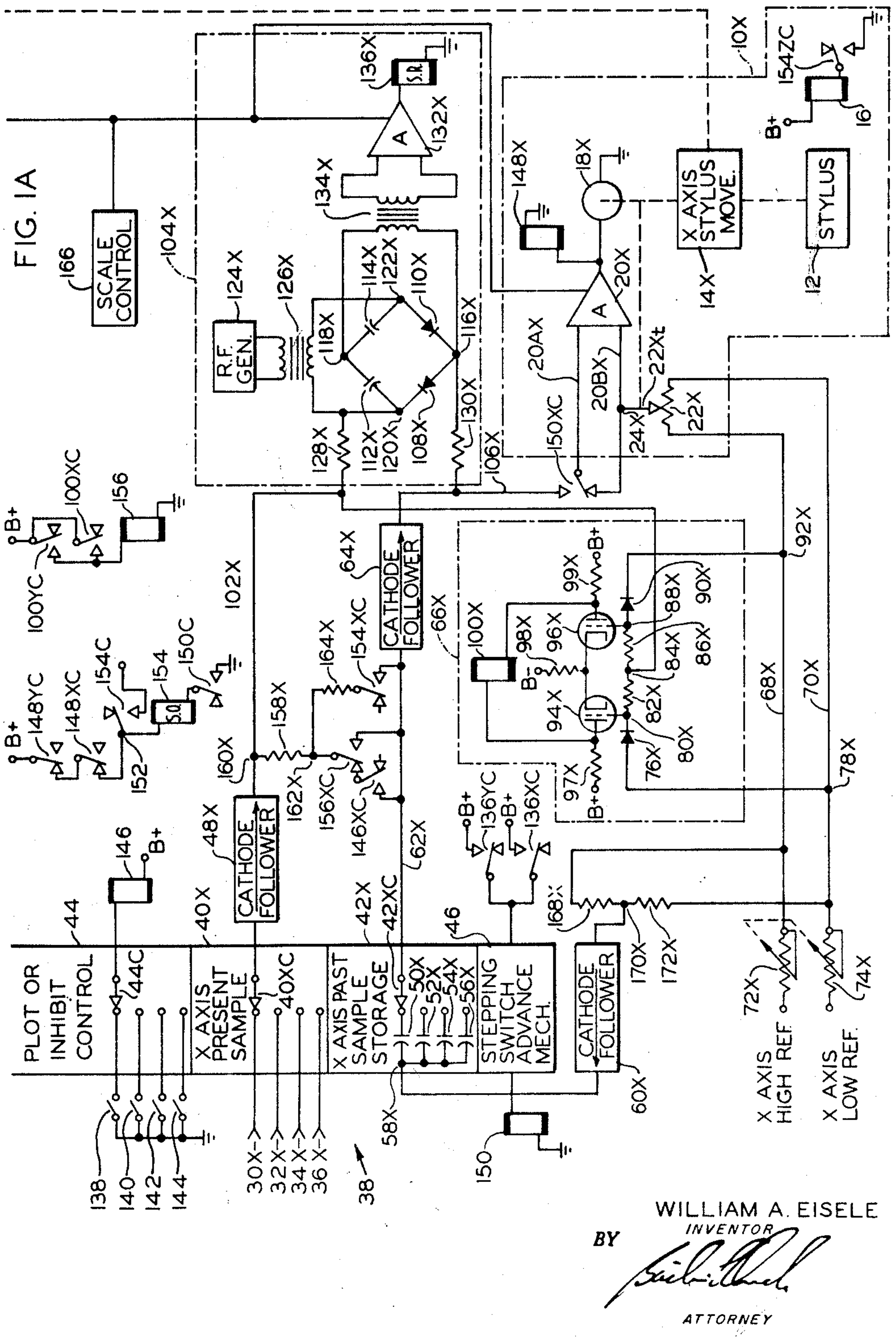

This invention relates to data plotting systems, and more particularly to a multiplexing system for plotting a plurality of pairs of channels by means of only one line recorder or plotter.

The use of a line recorder to record a function of two variables is well known in the prior art. The most common case is the recording of a voltage level which varies with respect to time. In such a case, a stylus or pen is moved along a first axis by a servo system in response to the voltage level on a single signal channel, while the record medium is moved along a second axis in response to the passage of time. In a slightly less common case, a stylus is moved along a first axis by a first servo system in response to a first voltage level on a first signal channel, and conjunctively along a second axis by a second servo system in response to a second voltage level on a second signal channel.

The first mentioned system can be used to record any number of variables on respective signal channels, each of which varies with respect to the same function of time, by the addition of a stylus and a servo system for each additional variable. Each stylus must travel along a path which is offset from the paths of the other styli to prevent interference among the styli.

In the second mentioned system the record medium does not move, and it is quite difficult to record more than one function of a pair of variables due to interference among the styli. That is, if the plots cross on the record medium, the styli and associated carriers must also cross and interengage. Systems have been proposed wherein when a crossing of plots occurs, the styli and their servo systems exchange signal channels and plots, thereby avoiding the necessity of crossing over each other. While this is feasible, although quite expensive, for two functions, it is prohibitively expensive for more than two functions and their associated styli and servo systems.

To avoid this plot crossing problem, applicant has developed a system wherein a single recorder is multiplexed with any desired number of pairs of signal channels. Although this technique prevents each pair of channels from being recorded continuously and uninterruptedly, it is very practical when a high sampling rate is utilized. It is exceedingly practical when not all of the functions are continuously varying, or varying greatly from one sampling interval to the subsequent sampling interval.

It is therefore an object of this invention to provide a single recorder for plotting a plurality of functions of two independently varying variables.

Another object is to provide a high speed multiplexing system for a plurality of pairs of channels utilizing a single recorder.

Still another object is to provide a high speed multiplexing system which will record only significant changes in each of the functions being plotted.

Yet another object is to provide a multiplexing system which will record only functions which exist between predetermined limits.

A further object is to provide a multiplexing system which will select only functions which exist between predetermined limits and which will provide an enlarged plot of such functions.

A feature of this invention is the provision of means for sequentially and periodically sampling each pair of a plurality of pairs of signal channels; means for storing a sample signal from each pair of channels; and means for sequentially and periodically coupling a single recorder to both a respective storage means and a pair of channels, thereby causing the recorder to plot the change in the signal from the previous sampling period to the present sampling period, and to store a new sample signal in the storage means.

Another feature of this invention is the provision of means for determining whether the change in the signals on a pair of channels from the previous sampling period to the present sampling period exceeds a predetermined minimum, and if it does not, causing the recorder to omit plotting the channels and to proceed to sample the signals on the next pair of channels.

Yet another feature of this invention is the provision of means for determining whether the signals on a pair of channels are within certain predetermined limits, and if they are not, causing the recorder to omit plotting the channels and to proceed to sample the signals on the next pair of channels.

Figure 1B:
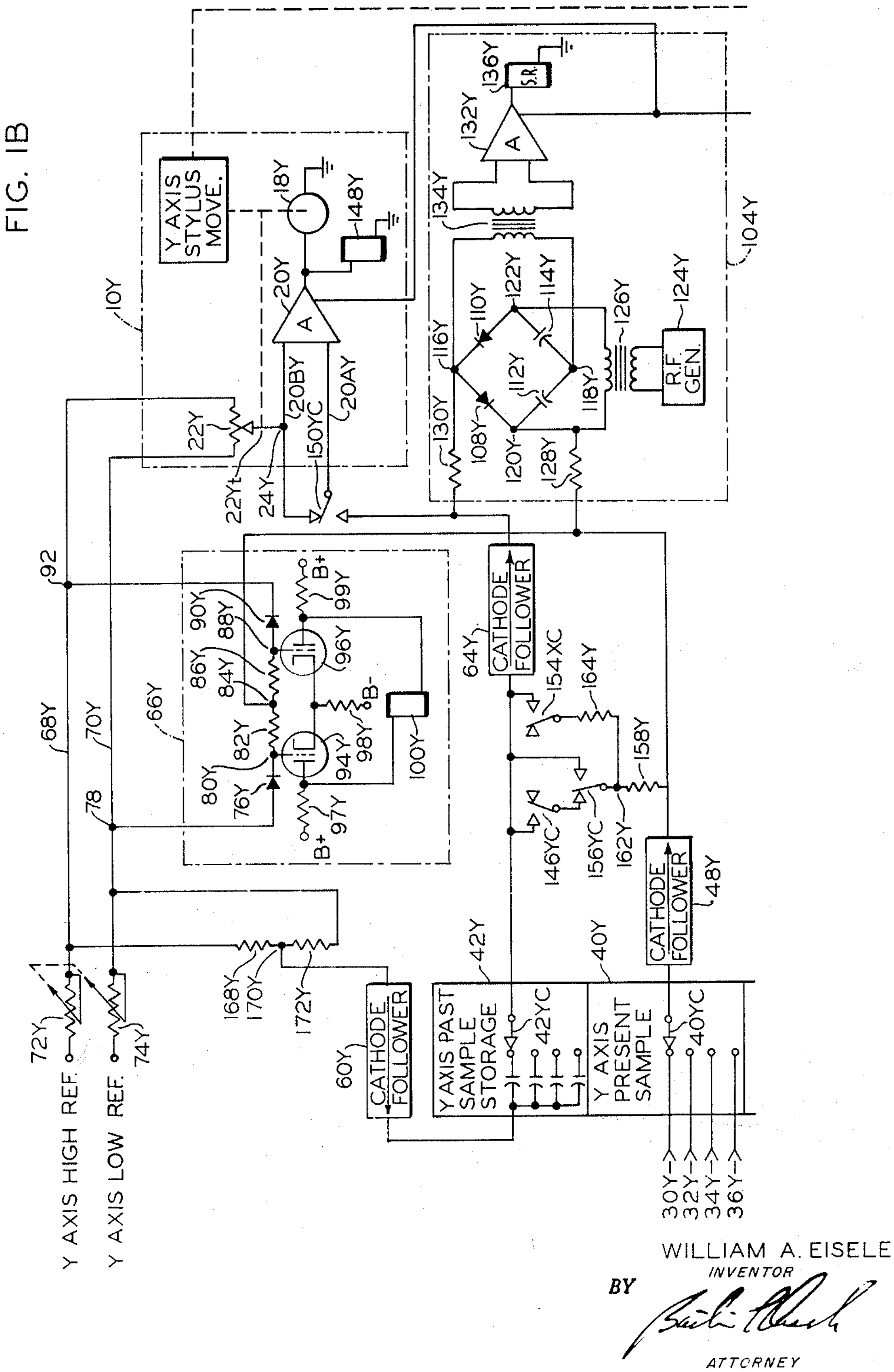
Figure 2:
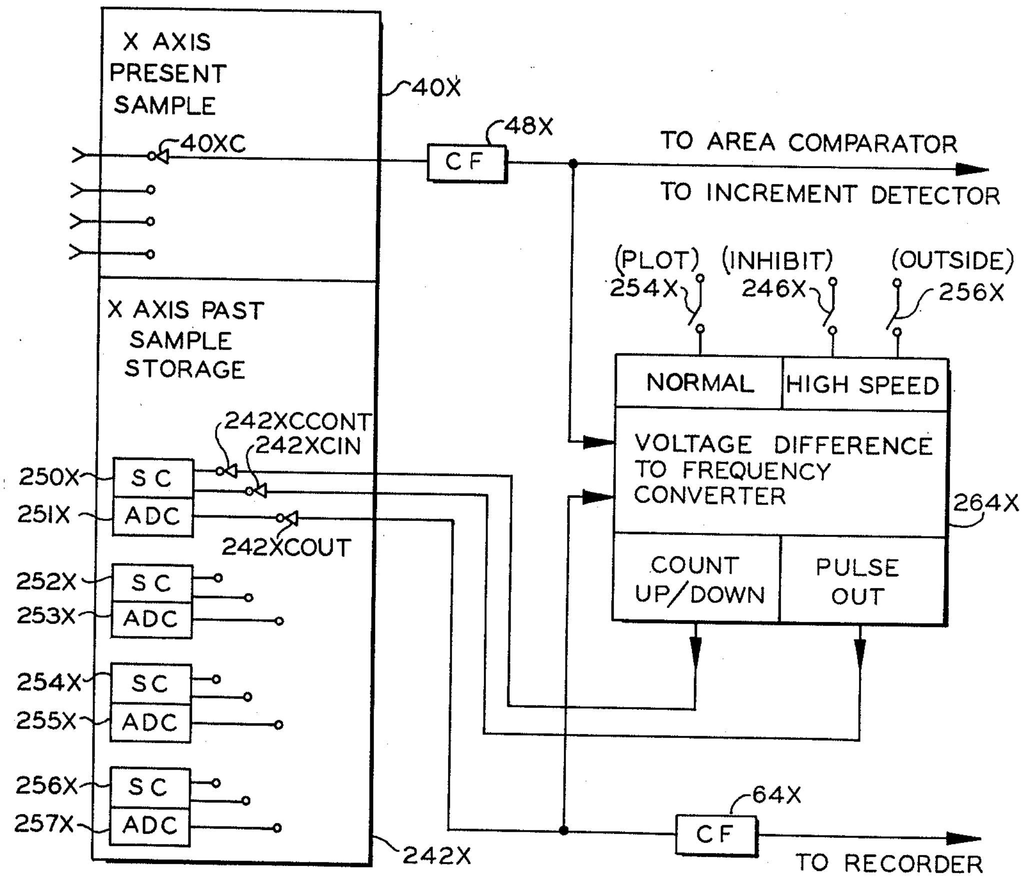

Further objects and features of the instant invention will become apparent from the following description taken in conjunction with the accompanying drawing in which:

FIGURES 1A and 1B, taken in conjunction, provide a schematic electrical circuit diagram of the instant invention; and FIGURE 2 is a schematic electrical circuit diagram of a modification of a detail of FIGURES 1A and 1B.

This invention provides a sampling system for a two coordinate recorder or plotter, whereby a single plotter is able to concurrently plot a plurality of input functions, each function being provided by a pair of input signal channels. A multiplexer sequentially and periodically samples each of the pairs of input channels and stores in storage means a sample signal from each sampled channel. During the subsequent sampling period the new or present sample is compared with the old or stored sample. If there is a difference between the values of the samples which is greater than a predetermined increment the change may be plotted. The present sample is also compared with a maximum and a minimum value and if it falls therebetween, and if it also meets the above-mentioned predetermined increment condition, the present sample will be plotted. In this case the plotter is connected to the storage means to start its plot at the stored sample value, then the present sample is connected to the storage means to update the storage means and to drive the plotter to the present sample value. If the present sample is not to be plotted because the value is outside of the maximum and minimum values, the present sample is nonetheless connected to the storage means to update the storage means. If the present sample is not to be plotted because the change is less than the predetermined increment, then the storage means is not updated.

Turning now to FIGURES 1A and 1B, reference numbers 10X and 10Y indicate in conjunction the plotter utilized in this invention. The plotter is shown for conjunctively plotting two variables, shown here in an X and Y Cartesian coordinate system. Other coordinate systems might be used. A stylus 12 is carried conjunctively by an X axis movement 14X and Y axis movement 14Y. Each of these movements is controlled by a similar control channel, of which the X channel will be described in detail hereinafter. Equivalent components in each channel will be identified by similar numerals ending in either X or Y as may be appropriate. The stylus 12 is biased away from the record medium (not shown) by suitable means (not shown). A write solenoid 16, when energized, engages the stylus with the record medium. The stylus X axis movement 14X is mechanically moved by a servo motor 18X which is powered by a servo amplifier 20X and which has input conductors 20AX and 20BX. The servo motor 18X is also mechanically coupled to the center tap 22X*t* of a servo feed-back potentiometer 22X. The center tap 22X*t* is connected, at 24X, to the servo amplifier input conductor 20BX.

The pairs of input signal channels, of which four pairs, 30X, 30Y; 32X, 32Y; 34X, 34Y; and 36X, 36Y; respectively, are shown, are coupled to a multiplexer or stepping switch 38. The stepping switch has five banks of contacts, viz: a X Axis Present Sample 40X, a X Axis Past Sample Storage 42X, a Y Axis Present Sample 40Y, a X Axis Past Storage 42X, a Plot or Inhibit Control 44; and an Advance Mechanism 46. The Advance Mechanism may be of the de-energize-to-advance type.

Each input channel 30X–36X is connected to a respective fixed contact in the X Axis Present Sample bank of contacts. The moving contact 40XC is coupled to the input of a cathode follower 48X.

One plate of each of four very-low-loss capacitors 50X, 52X, 54X, 56X is connected to a respective fixed contact in the X Axis Past Storage Sample bank of contacts. The other plates of each of the capacitors are connected together at junction 58X. This junction is connected to the output of a cathode follower 60X. The moving contact 42XC is connected to conductor 62X which is connected to the input of a cathode follower 64X.

An Area Comparator circuit 66X is provided to determine whether the voltage on the presently sampled channel, e.g. 30X, falls between a preset maximum and a minimum voltage. A pair of conductors 68X and 70X are respectively, via mechanically ganged together variable resistors 72X and 74X, connected to a high and a low reference voltage source (not shown). A differential amplifier circuit is connected across this pair of conductors. The anode of a diode 76X is connected, at 78X, to the conductor 70X. The cathode of the diode 76X is connected, at 80X, to one end of a resistor 82X, the other end of which is connected at 84X to one of a resistor 86X, the other end of which is connected, at 88X, to the anode of a diode 90X. The cathode of the diode 90X is connected, at 92X, to the conductor 68X. A pair of triodes 94X and 96X have their cathodes connected together and through a common cathode resistor 98X to B−. The grids of the triodes are respectively connected to the junctions 80X and 88X. The plates are respectively connected through load resistors 97X and 99X to B+ and to ends of a relay 100X. The output of the cathode follower 48X, the input of which is connected to the X Axis Present Sample 40X, is connected via a conductor 102X to the junction 84X. Current will flow through the relay 100X if the sample voltage at the junction 84X is not between the voltage levels set on the conductors 68X and 70X.

An Increment Detector 104X is provided to determine whether the present sample voltage at the output of the cathode follower 48X on the conductor 102X differs from the past stored sample voltage at the output of the cathode follower 64X on a conductor 106X by a predetermined increment. The detector includes a bridge network formed by two diodes 108X, 110X and two capacitors 112X, 114X. The anode of the diode 108X and the cathode of the diode 110X are connected to a node 116X. One plate of each of the capacitors 112X and 114X are connected to a node 118X, while the cathode of the diode 108X and the other plate of the capacitor 112X are connected to a node 120X. The anode of the diode 110X and the other plate of the capacitor 114X are connected to a node 122X. A radio frequency generator 124X is coupled via a transformer 126X across the bridge to the nodes 120X and 122X. One end of a resistor 128X is connected to the node 120X, the other end is connected to the conductor 102X. One end of a resistor 130X is connected to the node 116X, the other end is connected to the conductor 106X. The input of a tuned radio frequency amplifier 132X is coupled via a transformer 134X to the nodes 116X and 118X. The D.C. output of the amplifier 132X is connected to one end of the coil of a slow-to-release relay 136X, the other end of which coil is connected to a ground return. When the voltage levels on the conductors 102X and 106X are equal, the bridge is balanced, there is no input voltage developed across the winding of transformer 134X, and the output of the amplifier 132X is zero. When the voltage levels differ, the bridge becomes unbalanced, and a voltage is developed across the transformer 134X. As previously mentioned, the amplifier 132X is connected to provide a D.C. output to the relay 136X, and if the D.C. output level is above the pull-in current of the relay, the relay is operated and its contacts are shifted, indicating a sample voltage difference greater than the predetermined increment.

The Plot or Inhibit Control bank 44 of the stepping switch 38 has one end of each of four switches 138, 140, 142 and 144 respectively connected to each of the fixed contacts of the bank. The other ends of the switches are connected to a ground return. The moving contact 44C is connected to one end of the coil of a relay 146, the other end of which is connected to B+. When the moving contact 44C engages a fixed contact which is connected to a closed switch 138–144, the relay 146 is energized.

The coil of a relay 148X has one end connected to the output of the servo amplifier 20X and its other end connected to a ground return. When an error signal is fed to servo motor 18X, the relay 148X is energized.

The coil of a relay 150 has one of its ends connected to a ground return and its other end connected to the stepping switch advance mechanism 46 so that when B+ is applied to the advance mechanism, holding the stepping switch, the relay 150 is energized. The relay 150 may be considered the "plot" relay.

The increment detector relays 136X and 136Y each have a normally open contact set 136XC and 136YC respectively. The lever contact of each of contact sets 136XC and 136YC are connected to the stepping switch advance mechanism 46. The normally open fixed contact of each of the contact sets is connected to B+. Thus when either or both of the increment detector relays 136X and 136Y are energized, a closed circuit is provided from the ground return, through the plot relay 150, through the stepping switch advance mechanism 46, and through either or both of the contacts sets 136XC and 136YC to B+.

The servo relays 148X and 148Y each have a normally closed contact set 148XC and 148YC respectively. The lever contact of set 148YC is connected to B+, and its normally closed fixed contact is connected to the lever contact of set 148XC, whose normally closed fixed contact is connected, at 152 to one end of the coil of a slow-to-operate relay 154. The other end of the coil of the relay 154 is connected to the lever contact of the contact set 150C of the plot relay 150, whose normally open contact is connected to a ground return. A normally open fixed contact of the contact set 154C of the relay 154 is connected to B+, while its lever contact is connected to the junction 152. The contact set 154C acts as a latching contact for the relay 154. The plot relay 150 has two other contact sets, 150XC and 150YC. The normally open contact of set 150XC is connected to the output of the cathode follower 64X via the conductor 106X. The normally closed contact of set 150XC is connected to the servo amplifier input conductor 20BX, and at the junction 24X, to the servo potentiometer center-tap 22X*t*. The lever contact of set 150XC is connected to the servo amplifier input conductor 20AX. Thus, when the plot relay 150 is de-energized, its contact set 150XC directly connects the conductor 20AX to the conductor 20BX, precluding any input signal to the servo amplifier 20X and, therefore, any output signal to the servo motor 18X. When the plot relay 150 is energized, its contact set 150XC connects the output of the cathode follower 62X, via the conductor 106X, to the servo amplifier input conductor 20AX, while conductor 20BX remains connected solely to the servo potentiometer center tap 22X*t*. Any difference in voltage levels on the conductors 20AX and 20BX will be amplified by the servo amplifier 20X and fed to the servo motor 18X, and will also energize the servo relay 148X.

Each area detector relay 100X and 100Y has a contact set 100XC and 100YC. The lever contacts of each of the sets 100YC and 100XC are connected to B+, while the normally open fixed contacts of each of the sets is connected to one end of the coil of a relay 156, the other end of which is connected to a ground return. Thus when either of out-of-area relays 100X and 100Y is energized the relay 156 will be energized.

One end of a low resistance resistor 158X is connected, at 160X, to the conductor 102X which is connected to the output of the cathode follower 48X. The other end of the resistor 158X is connected to a junction 162X, to which is connected one end of a high resistance resistor 164X. The other end of the high resistor 164X is connected to the lever contact of the contact set 154XC of relay 154. The normally open fixed contact of set 154XC is connected to the conductor 62X which is connected to the X Axis Past Sample Storage 42X. The lever contact of contact set 156XC of relay 156 is connected to the junction 162X. The normally open fixed contact of contact set 156XC is connected to the conductor 62X, and the normally closed fixed contact is connected to the lever contact of contact set 146XC of the inhibit control relay 146. The normally open fixed contact of set 146XC is connected to the conductor 62X. Thus, when only relay 146 is energized, and whenever relay 156X is energized, the conductor 102X will be connected to the conductor 62X through the low resistor 158X. When the slow-to-operate relay 154 is energized, the conductor 102X will be connected to the conductor 62X through the low resistor 158X and the high resistor 164X in series. A contact set 154ZC of the relay 154 is provided to operate the stylus solenoid 16. One end of the solenoid 16 is connected to B+, the other end is connected to the lever contact of set 154ZC. The normally open fixed contact is connected to a ground return.

A scale control 166, which may be a grid bias level control, may be connected to each of the radio frequency tuned amplifiers 132X and 132Y and the servo amplifiers 20X and 20Y to vary the gain of the several amplifiers of the system in conjunction.

One end of a resistor 168X is connected to the X axis high area reference conductor 68X and the other end is connected to a junction 170X. One end of a resistor 172X, which has a resistance is equal to 168X, is connected to the X axis low area reference conductor 70X, and the other end is connected to the junction 170X. The input of the cathode follower 60X is connected to the junction 170X, and as previously noted, its output is connected, at junction 58X, to one plate of each of the past sample storage capacitors 50X–56X. This voltage divider network resistors 168X and 172X biases each of the capacitors to a level which is exactly between the levels on the conductors 72X and 74X, i.e., to the center of the X coordinate of the plotting area.

*Theory of operation*

Initially the reference levels for the Area Comparators 66X and 66Y are set. Variable resistances 72X, 74X, 72Y and 74Y are adjusted to set the desired maximum and minimum voltage levels on the X axis high conductor 68X, the X axis low conductor 70X, the Y axis high conductor 68Y and the Y axis low conductor 70Y, respectively. Only the signals appearing within the area, boundaries or frame provided by these four levels are to be plotted. The scale control 166 may be adjusted to provide the desired scale of the system.

In the first sampling period, the stepping switch advance mechanism 46 moves each moving contact of each contact bank to the first fixed contact. The first channel pair 30X and 30Y are sampled. Consider the X axis channel: The sampled voltage on the conductor 30X is unidirectionally passed by the cathode follower 48X to the conductor 102X which is connected to the junction 84X of the area comparator 66X. If the sampled voltage at the junction 84X is above the level on the conductor 68X or is below the level on the conductor 70X, current will flow through one of the diodes 76 or 90, causing a rise in the grid bias of one of the triodes 94 and 96, which are normally biased to cut-off, driving the triode into conduction, and resulting in a voltage differential across the coil of the relay 100X, thereby energizing the relay. The energized out-of-area relay 100X energizes the relay 156 and shorts the conductor 102X through low resistor 158X to the conductor 62X. The resistance of the resistor 158X is very low and is provided only to protect the relay contacts. The full sample voltage is now on the conductor 62X and the capacitor 50X is charged to its level. The Y axis channel operates in a similar manner.

If the sampled voltage brought to the junction 84X is within the levels of the voltages on the conductors 72X and 74X, indicating that the plotting point is within the X coordinates of the plotting area, the relay 100X will not be energized. If, also, the inhibit switch 138 is closed to the ground return, then the inhibit relay 146 will be energized, and the conductor 102X will be shorted to the conductor 62X through the low resistor 158X, the normally closed contacts 156XC, and the energized closed contacts 146XC, thereby charging the capacitor 55X to the sampled voltage level.

If the sampled voltage brought to the junction 48X is within the levels of the voltages on the conductors 72X and 74X, indicating that the plotting point is within the X coordinates of the plotting area, the relay 100X will not be energized. If, also, the inhibit switch 138 is open, the inhibit relay 146 will not be energized. The present sample voltage on the input conductor 30X will be passed by the cathode follower 48X, the conductor 102X and the resistor 128X to the node 120X of the bridge of the increment detector 104X. The past sample voltage on the capacitor 50X, which during this first sample period will be the area midpoint voltage from the voltage divider 168X–172X, will be passed by the conductor 62X, the cathode follower 64X, the conductor 106X and the resistor 130X to the node 116X of the bridge of the increment detector 104X. The bridge circuit was previously balanced, so that no D.C. voltage difference existed between the nodes 118X and 116X. Any voltage difference now impressed between the nodes 120X and 116X will effect a D.C. unbalance between the nodes 116X and 118X and an input signal, via the transformer 134X, to the tuned radio frequency amplifier 132X, which in turn will provide a D.C. output to the coil of the relay 136X.

If the difference between the present sample and past sample voltage levels is greater than a predetermined value, the D.C. output of the tuned RF amplifier 132X will operate the contacts of relay 136X. If the difference is less than the predetermined value, the contacts of relay 136 will not be operated. If the difference or increment is low, and the relay 136X is not operated, then B+ is not held on the stepping switch advance mechanism 46, which moves the moving contacts of the stepping switch 38 to the next level of fixed contacts. The plot relay 150 is not energized, nor is any connection made between the conductors 120X and 62X; thus the voltage level stored on the capacitor 50X is not changed, i.e. the storage capacitor is not updated.

If the difference or increment is high, the contacts of the relay 136X will be operated and B+ will be held on the stepping switch advance mechanism 46 and on the plot relay 150. The relay contacts 150XC are operated, connecting the servo amplifier input conductor 20AX to the past storage capacitor 50X by way of the conductor 106X, the cathode follower 64X, and the conductor 62X. Any difference between the past sample voltage on the capacitor 50X and on the center tap 22X*t* of the servo feedback potentiometer 22X will apear as an input signal to the servo amplifier 20X, which in turn will power the servo motor 18X to drive the stylus X axis movement 14X and the center tap 22X*t* to the mechanical position representative of the past sample voltage. In the first sampling period, this will be midway between the high and the low reference voltage levels. It may be noted that biasing the storage capacitors 50X–56X to this midpoint voltage level also minimizes the effect of any leakage of charge. The maximum possible charge across the plates of the capacitor is one half the difference between the high and low reference voltage levels. The discharge rate is a percentage of the charge. Thus the leakage is always one half or less than one half what the discharge might have been had the capacitors been biased to one of the reference level voltages.

During the initial examination of the sample voltages, the coil of the relay 148X is not energized and the contact set 148XC is in its normally closed position (also the contact set 148YC of the Y channel). When the coil of the plot relay 150 is energized, its contact set 150C is operated, energizing the coil of the relay 154. The relay 154, however, is of the slow-to-operate type, and before its latching contact set 154C can operate, the coil of the relay 148X is energized, opening its contact set 148XC and de-energizing the coil of the relay 154. When the stylus 12 has been moved to the mechanical position representative of the past voltage sample, the coil of the relay 148X is de-energized and its contact set 148XC returns to its normally closed position, again energizing the coil of the relay 154. The contact set 154C is slowly operated and the coil of the relay is latched from B+ via the contact set 154C and the contact set 150C to the ground return. The contact set 154ZC is also slowly operated to energize the write solenoid 16 by connecting it between B+ and the ground return, which engages the stylus 12 with the record medium. The contact set 152XC is also slowly operated and connects the past sample storage capacitor 50X, via the conductor 62X, the high resistor 164X, the low resistor 158X, and the conductor 102X to the output of the cathode follower 48X, which has the present sample voltage conductor 30X at its input. The capacitor 50X is charged or discharged to the level of the present sample conductor 30X. The charging rate is determined by the time constant of the path described above, which is substantially determined by the resistance of the high resistor 164X. During this charging interval, the input conductor 20AX of the servo amplifier is still connected, as previously described, to the capacitor 50X, and as this capacitor is charged or discharged to the present sample voltage level, the servo amplifier 20X, the motor 18X, the feedback potentiometer center tap 22X*t*, the stylus X axis movement 14X, and the engaged stylus 12 follow, until the present sample voltage level is reached. The output of the servo amplifier is now zero, and the coil of the relay 148X is deenergized. As the storage capacitor 50X approaches the present voltage level, the voltage difference across nodes 120X and 116X falls below the predetermined increment. However, the relay 136X is of the slow-to-release type, and by the time its contacts sets have de-operated, the capacitor 50X and the stylus X axis movement 14X are at the electrical and mechanical present sample voltage level and position. When the relay contact set 136XC de-operates, the coil of the plot relay 150 is de-energized, the contact set 150C deoperates, de-energizing the coil of the relay 154, whose contact set 154ZC is in turn de-operated, de-energizing the stylus engage solenoid 16, thereby releasing the stylus from the record medium. The contact set 150XC also de-operates, disconnecting the servo amplifier 20X from the stepping switch. The stepping switch advance mechanism also operates, driving the moving contacts of each fixed contact bank to the next level of fixed contacts. The present sample conductor 32X is now sampled in conjunction with the past sample storage capacitor 52X. In this manner each of the conductors 30X through 36X are sampled sequentially. When the last conductor 36X has been sampled, the stepping switch advance mechanism automatically restores the moving contacts to the first level of fixed contacts and the next sampling period begins.

The operation during the second and subsequent sampling periods is identical to that described for the first sampling period, except that each storage capacitor now has in store the sample voltage of the prior sampling period rather than the arbitrary mid-coordinate voltage provided by the voltage divider 168–172X.

As previously indicated the operations of the Y channel are identical to the described operations of the X channel.

The operation of the multiplexer system may be recapitulated as follows:

If either or both of the X or Y present sample voltages is outside the X or Y coordinate high and low reference voltage levels, respectively, the plotting point is outside of the plotting area and not to be plotted. Either or both of the area comparator relays 100X and 100Y will operate, operating the relay 156, which in turn will connect the X and Y present sample conductors to the X and Y past sample storage capacitors, respectively, via the low resistances 158X and 158Y, respectively; the stepping switch then moves to the next pair of conductors. The past sample storage is thereby updated, but the point is not plotted.

If the plotting point is within the plotting area, but the inhibit switch for the conductor pair is closed, the relay 146 will operate to connect the X and Y present sample conductors to the X and Y past sample storage capacitors, respectively, via the low resistances 158X and 158Y, respectively. The stepping switch then moves to the next pair of conductors. The past sample storage is thereby updated, but the point is not plotted.

If the plotting point is within the area, the inhibit switch is open, and neither of the X and Y present samples is more or less than the predetermined increment from its respective past sample, then the inhibit relay 146 will not operate; and neither of the X and Y area relays 100X and 100Y will operate, thus relay 156 will not operate. Further, neither of the increment relays 136X and 136Y will operate, and the stepping switch advance mechanism will be released to advance the moving contacts to the next level of fixed contacts. Thus the past sample storage will not be updated and the point will not be plotted.

If the plotting point is within the area, the inhibit switch is open, and either or both of the X and Y present samples is more or less than the predetermined increment from its respective past sample, then the inhibit relay 146 will not operate; and neither of the X and Y area relays 100X and 100Y will operate. Further, either or both increment relays 136X and 136Y will operate, holding the stepping switch advance mechanism 46 and operating the plot relay 150, which connects the X and Y servo amplifiers 20X and 20Y to the X and Y past sample storage cathode followers 64X and 64Y respectively. The error output of each servo amplifier operates its respective servo motor to move the X and Y stylus movements to the past sample position. The error outputs also operate either or both of the relays 148X and 148Y to maintain the relay 154 de-operated. When the stylus movements are both at the past sample position, the relays 148X and 148Y are both de-operated, permitting the relay 154 to operate, to energize the stylus solenoid 16, and to connect the X and Y present sample conductors to the X and Y past sample storage capacitors, respectively, via the high resistors 164X and 164Y, respectively. The past sample capacitors charge or discharge to the respective present sample voltages, and the X and Y servo amplifiers and motors follow. When the X and Y stylus movements are at the present sample values, the relays 148X and 148Y de-operate, the relay 154 de-operates, de-energizing the stylus solenoid 16. The X and Y increment relays also slowly de-operate, de-operating the relay 150 to disconnect the servo amplifiers and to release the stepping switch advance mechanism to drive the moving contacts to the next level of fixed contacts. Thus a line segment has been drawn on the record medium from the past point to the present point, and the past sample storage has been updated.

It will be appreciated that various modifications of the embodiment of the invention disclosed in FIGURES 1A and 1B are possible. In the event that the negligible leakage of the capacitors utilized in the past sample storage of each channel is unacceptable, a digital storage is provided for each channel, e.g. 242X, as shown in part in FIGURE 2. A digital type of storage, specifically a plurality of serial pulse counters 250X, 252X, 254X and 256X are respectively substituted for the storage capacitors 50X, 52X, 54X and 56X. The output terminals of each counter are connected to the input terminals of a respective digital to analog converter 251X, 253X, 255X and 257X. The output terminal of each analog to digital converter is connected to a fixed contact in a bank which is engaged by a moving contact 242XCOUT. Each serial counter has a control input terminal which is connected to a fixed contact in a bank which is engaged by a moving contact 242XCCONT. The polarity of the voltage on this terminal determines whether the counter is to count up or down. Each serial counter also has a pulse input terminal which is connected to a fixed contact in a bank which is engaged by a moving contact 242XCIN. Pulses received at this terminal step the counter. A voltage-difference-to-frequency converter 264X has its input terminals connected to the present sample moving contact 40XC via the cathode follower 48X, and to the past sample analog output moving contact 242XCONT. This converter 264X generates output pulses at a rate which is directly proportional to the voltage applied at its input. A converter of this type is made by Dymec, a division of Hewlett-Packard Company, under specification 5207-1. The converter pulse output terminal is connected to the counter input moving contact 242XCIN, and the converter control terminal is connected to the counter control moving contact 242XCCONT. The converter is controlled to provide pulses at either a high speed rate or a normal rate. A switch 246X, which is equivalent to the inhibit contact set 146XC, and a switch 256X, which is equivalent to the out-of-area contact set 156XC, are connected to the converter to cause it to operate at high speed. A switch 254X, which is equivalent to the plot contact set 154XC is connected to the converter to cause it to operate at normal speed. This converter system is substituted for the contact set and resistor system, 146XC, 156XC, 158X, 164X and 154XC of FIGURE 1A. The biasing system 168X, 172X, 60X and 58X of FIGURE 1A is omitted. The digital operation of the system of FIGURE 2 is analogous to the analog operation of the system of FIGURE 1A. When an inhibit switch, e.g. 138, is closed, the switch 246X is closed to operate the converter 264X at high speed to update the storage, e.g. 250X. When the present sample outside the plotting area the switch 256X it closed to operate the converter 264X at high speed to update the storage, e.g. 250X. When the present sample is to be plotted, the recorder is connected to the output of the respective analog-to-digital converter, e.g. 251X, via contact 242XCONT, and the recorder is driven to the past sample position. The switch 254X is closed to operate the voltage-difference-to-frequency converter 264X at its normal rate. The converter determines the polarity of the difference between the present and past sample and provides in response thereto a count-up or count-down signal to the counter, e.g. 250X, via the contact 242XCCONT, and a plurality of pulses, via the contact 242XCIN until the past sample and the present sample are equal. At this time the recorder has been driven to the present sample position and the past sample storage has been updated.

I have thus shown and described my invention, but I desire it to be understood that it is not confined to the particular forms or usages shown and described, the same being merely illustrative, and that my invention may be carried out in other ways without departing from the spirit of my invention, and, therefore, I claim broadly the right to employ all equivalent instrumentalities coming within the scope of the appended claims, and, by means of which, objects of my invention are attained and new results are accomplished, as it is obvious that the particular embodiments herein shown and described are only some of the many that can be employed to attain these objects and to accomplish these results.

What is claimed is:

1. A recording system for a plurality of signal channels comprising:

signal recording means;

a plurality of signal storage means;

means operative during a first time period for selectively coupling each of said signal storage means to a respective signal channel, thereby storing in said signal storage means a signal representative of the signal on said respective coupled-to channel, and then decoupling said selected storage means from said respective channel;

means operative during a second time period for firstly, selectively and individually, coupling said recording means to each of said storage means, thereby driving said recording means to indicate the signal stored in said selected coupled-to storage means, and secondly also coupling said respective signal channel to said selected storage means, thereby driving said recording means to indicate the signal on said respective signal channel during said second time period and to record the change in signal on said respective signal channel from said first to said second time period, and also thereby concurrently storing in said selected coupled-to storage means a signal representative of the signal on said respective coupled-to channel during said second time period.

2. A recording system according to claim 1 further including:

means operative during said second time period to compare the signal stored during said first time period in said selected storage means with the signal on said respective signal channel to determine whether these signals differ by an extent greater than a given incremental value, and on determining said difference not to be present, causing said means for coupling during said second time period to omit said coupling and said recording.

3. A recording system for plotting a plurality of signal channels comprising:

signal recording means;

a plurality of signal storage means;

means operative during a first time period for selectively and sequentially coupling and decoupling each of said signal storage means to a respective signal channel, thereby storing in said signal storage means a signal representative of the signal on said respective coupled-to channel;

means operative during a second time period for selectively and sequentially, firstly coupling said recording means to each of said storage means, thereby driving said recording means to indicate the signal stored in said selected coupled-to storage means, and secondly also coupling said respective signal channel to said selected storage means, thereby driving said selected storage means to store a signal representative of the signal on said respective coupled-to channel during said second time period and concurrently driving said recording means to indicate the signal on said respective coupled-to channel during said second time period and to record the change in signal on said respective channel from said first to said second time period.

4. A system according to claim 3 further including:

increment means operative during said second period to compare the signal stored during said first time period in said selected storage means with the signal on said respective signal channel to determine whether these signals differ by an extent greater than a given incremental value, and on determining said difference not to be present, causing said means for coupling during said second time period to omit said coupling and said recording.

5. A system according to claim 3 further including:

area means operative during said second period to compare the signal on said respective signal channel with a pair of reference signals and on determining the channel signal to have a first relationship to said reference signals, causing said means for coupling to omit the said coupling of said recording means to said selected storage means and to proceed with said coupling of said respective signal channel to said selected storage means.

6. A system according to claim 5 wherein said area means on determining the channel signal to have a second relationship to said reference signals, which is different from said first relationship, causing said means for coupling to proceed with said coupling of said recording means to said selected storage means, and said respective signal channel to said selected storage means.

7. A system according to claim 6 wherein said pair of reference signals are a high and a low value signal and said second relationship is established by the value of the channel signal lying between said high and said low values; and said first relationship is established by the value of the channel signal lying outside the range between said high and said low values.

8. A system according to claim 1 wherein each of said storage means includes an analog type storage device.

9. A system according to claim 1 wherein each of said storage means includes a capacitor.

10. A system according to claim 7 wherein each of said storage means includes a capacitor having two plates, one of said plates being coupled and decoupled by said means operative during said first time period to said respective signal channel, the other of said plates being provided with a signal which is midway between said high and said low reference signal values.

11. A system according to claim 1 wherein each of said storage means includes a digital type storage.

12. A recording system for a plurality of pairs of signal channels comprising signal recording means for recording two signals in conjunction;

a plurality of pairs of signal storage means;

means operative during a first time period for selectively coupling each one of each of said pairs of said signal storage means to a respective one of each of said pairs of signal channels, thereby storing in said signal storage means a signal representative of the signal on said respective coupled-to channel, and then decoupling said selected storage means from said respective channel;

means operative during a second time period for firstly, selectively and individually, coupling said recording means to each of said pairs of said signal storage means, thereby driving said recording means to indicate in conjunction the signals stored in said selected coupled-to pair of storage means, and secondly also coupling each said one of said respective pair of signal channels to each said one of said respective pair of selected storage means, thereby driving said recording means to indicate in conjunction the signals on said respective pair of signal channels during said second time period and to record the changes in the signals on said respective pairs of signal channels from said first to said second time period, and also thereby concurrently storing in each of said selected pair of coupled-to storage means a signal representative of the signal on each of said respective pair of coupled-to channels during said second time period.

13. A recording system according to claim 12 further including means operative during said second time period to compare the signals stored during said first time period in each of said selected pair of storage means with the signals on each of said respective pair of signal channels to determine whether either of these sets of respective signals includes a difference of an extent greater than a given incremental valve, and on determining said difference not to be present, causing said means for coupling during said second time period to omit said coupling and said recording.

14. A recording system for plotting a plurality of pairs of signal channels comprising:

signal recording means for recording two signals in conjunction;

a plurality of pairs of signal storage means;

means operative during a first time period for selectively and sequentially coupling and decoupling each one of each of said pairs of said signal storage means to a respective signal channel, thereby storing in each of said signal storage means a signal representative of the signal on said respective coupled-to channel;

means operative during a second time period for selectively and sequentially, firstly coupling said recording means to each of said pairs of said signal storage means, thereby driving said recording means to indicate in conjunction the signals stored in said selected coupled-to pair of storage means, and secondly also coupling each said one of said respective pair of signal channels to each one of said respective pair of selected storage means, thereby driving said recording means to indicate in conjunction the signals on said respective pair of signal channels during said second time period and to record the changes in the signals on said respective pair of signal channels from said first to said second time period, and also thereby concurrently storing in each of said selected pair of coupled-to storage means a signal representative of the signal on each of said respective pair of coupled-to channels during said second time period.

15. A system according to claim 14 further including:

increment means operative during said second period to compare the signals stored during said first time period in each of said selected pair of storage means with the signals on each of said respective pair of signal channels to determine whether either of these sets of respective signals includes a difference of an extent greater than a given incremental value, and on determining said difference not to be present causing said means for coupling during said second time period to omit said coupling and said recording.

16. A system according to claim 14 further including area means operative during said second period to compare each of the signals on said respective pair of signal channels with a respective pair of reference signals and on determining either of the channel signals to have a first relationship to said respective reference signals, causing said means for coupling to omit said coupling of said recording means to said selected pair of storage means and to proceed with said coupling of said respective pair of signal channels to said selected pair of storage means.

17. A system according to claim 16 wherein said area means on determining either of the channel signals to have a second relationship to said respective pair of reference signals, which is different from said first relationship, causing said means for coupling to proceed with said coupling of said recording means to said selected pair of storage means, and said respective pair of signal channels to said selected pair of storage means.

18. A system according to claim 17 wherein each of said pairs of reference signals are a high and a low value signal and said second relationship is established by the value of the channel signal lying between said high and low values; and said first relationship is established by the value of the channel signal lying outside the range between said high and said low values.

19. A recording system for a plurality of signal channels comprising:

signal recording means;

a plurality of signal storage means, each storage means being adapted to be varied from one signal storage condition, through intermediate storage conditions, to a second storage condition;

coupling means operative during a first, initial, time period for selectively coupling each of said signal storage means to a respective signal channel, thereby storing in said signal storage means a signal representative of the signal on said respective coupled-to channel, and then decoupling said selected storage means from said respective channel;

said coupling means operative during a second, subsequent, time period for firstly, selectively and individually, coupling said recording means to each of said storage means, thereby driving said recording means to indicate the signal stored in said selected coupled-to storage means, and secondly also coupling said respective signal channel to said selected storage means, thereby driving said recording means to indicate the signal on said respective signal channel during said second time period and to record the change in signal on said respective signal channel from said first period through to the signal on said respective signal channel at said second time period, and also thereby concurrently storing in said selected coupled-to storage means a signal representative of the signal on said respective coupled-to channel during said second time period.

20. A recording system for a plurality of pairs of signal channels comprising:

a signal recording means for recording two signals in conjunction by moving a single stylus means with respect to two axes;

a plurality of pairs of signal storage means;

means operative during a first time period for selectively coupling each one of each of said pairs of said signal storage means to a respective one of each of said pairs of signal channels, thereby storing in said signal storage means a signal representative of the signal on said respective coupled-to channel, and then decoupling said selected storage means from said respective channel;

said coupling means operative during a second, subsequent, time period for firstly, selectively and individually, coupling said recording means to each of said pairs of said signal storage means, thereby driving said recording means to indicate in conjunction the signals stored in said selected coupled-to pair of storage means, and secondly also coupling each said one of said respective pair of signal channels to each said one of said respective pair of selected storage means, thereby driving said recording means to indicate in conjunction the signals on said respective pair of signal channels during said second time period and to record the changes in the signals on said respective pairs of signal channels from said first period through to the signal on said respective signal channel at said second time period, and also thereby concurrently storing in each of said selected pair of coupled-to storage means a signal representative of the signal on each of said respective pair of coupled-to channels during said second time period.

References Cited by the Examiner

UNITED STATES PATENTS

| | | | |
|---|---|---|---|
| 2,579,831 | 12/51 | Keinath | 346—33 |
| 2,818,321 | 12/57 | Searles | 346—34 |
| 2,953,777 | 9/60 | Gridley | 346—34 |
| 2,958,766 | 11/60 | Evans | 340—149 |
| 3,065,466 | 11/62 | Hickman | 346—34 |
| 3,099,512 | 7/63 | Kohler | 346—34 |

LEO SMILOW, *Primary Examiner.*